(12) United States Patent
Sakamoto et al.

(10) Patent No.: US 10,903,484 B2
(45) Date of Patent: Jan. 26, 2021

(54) METAL INFILTRATED ELECTRODES FOR SOLID STATE BATTERIES

(71) Applicant: THE REGENTS OF THE UNIVERSITY OF MICHIGAN, Ann Arbor, MI (US)

(72) Inventors: Jeffrey Sakamoto, Ann Arbor, MI (US); Travis Thompson, Ann Arbor, MI (US); Nathan Taylor, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 101 days.

(21) Appl. No.: 15/793,057

(22) Filed: Oct. 25, 2017

(65) Prior Publication Data

US 2018/0114977 A1 Apr. 26, 2018

Related U.S. Application Data

(60) Provisional application No. 62/412,965, filed on Oct. 26, 2016.

(51) Int. Cl.
*H01M 4/1395* (2010.01)
*H01M 4/38* (2006.01)
(Continued)

(52) U.S. Cl.
CPC ....... *H01M 4/1395* (2013.01); *H01M 4/0416* (2013.01); *H01M 4/0471* (2013.01);
(Continued)

(58) Field of Classification Search
CPC ........ H01M 4/1395; H01M 4/38; H01M 4/58; H01M 4/131; H01M 4/1391
See application file for complete search history.

(56) References Cited

U.S. PATENT DOCUMENTS 2,157,072 A * 5/1939 Eddy .................. H01M 4/02
429/220
2,733,161 A 1/1956 Lytton
(Continued)

FOREIGN PATENT DOCUMENTS

WO 2017062950 A1 4/2017
WO 2017106817 A1 6/2017

OTHER PUBLICATIONS

Mukhopadhyay, et al., Structure and Stoichiometry in Supervalent Doped Li7La3Zr2O12, Chemistry of Materials, 2015, 27(10):3658-3665.

(Continued)

*Primary Examiner* — Kenneth J Douyette
(74) *Attorney, Agent, or Firm* — Quarles & Brady LLP

(57) ABSTRACT

Disclosed are electrochemical devices and methods for making electrochemical devices such as metal infiltrated electrodes for solid state lithium ion and lithium metal batteries. In one method for forming an electrode, a metal is infiltrated into the pore space of the active material of the electrode providing improved electronic conductivity to the electrode. The electrode may also include a solid-state ion conducting material providing improved ion conductivity to the electrode. Before infiltration of the metal, a stabilization coating may be applied to the active material and/or the solid-state ion conducting material to the stabilize electrode interfaces by slowing, but not eliminating, the chemical reactions that occur at elevated temperatures during sintering of the active material and/or the solid-state ion conducting material forming the electrode.

17 Claims, 4 Drawing Sheets
(1 of 4 Drawing Sheet(s) Filed in Color)

(51) Int. Cl.

| | | |
|---|---|---|
| *H01M 4/58* | (2010.01) | |
| *H01M 4/525* | (2010.01) | |
| *H01M 4/139* | (2010.01) | |
| *H01M 4/62* | (2006.01) | |
| *H01M 4/04* | (2006.01) | |
| *H01M 10/052* | (2010.01) | |
| *H01M 4/13* | (2010.01) | |
| *H01M 10/0562* | (2010.01) | |
| *H01M 4/131* | (2010.01) | |
| *H01M 4/1391* | (2010.01) | |
| *H01M 4/505* | (2010.01) | |
| *H01M 4/66* | (2006.01) | |
| *H01M 4/485* | (2010.01) | |
| *H01M 4/587* | (2010.01) | |
| *H01M 4/02* | (2006.01) | |

(52) U.S. Cl.
CPC ............. *H01M 4/13* (2013.01); *H01M 4/131* (2013.01); *H01M 4/139* (2013.01); *H01M 4/1391* (2013.01); *H01M 4/38* (2013.01); *H01M 4/382* (2013.01); *H01M 4/505* (2013.01); *H01M 4/525* (2013.01); *H01M 4/581* (2013.01); *H01M 4/62* (2013.01); *H01M 4/667* (2013.01); *H01M 10/052* (2013.01); *H01M 10/0562* (2013.01); *H01M 4/386* (2013.01); *H01M 4/387* (2013.01); *H01M 4/485* (2013.01); *H01M 4/587* (2013.01); *H01M 4/5825* (2013.01); *H01M 2004/021* (2013.01); *H01M 2300/0037* (2013.01); *H01M 2300/0071* (2013.01); *Y02T 10/70* (2013.01)

(56) References Cited

U.S. PATENT DOCUMENTS

| | | | |
|---|---|---|---|
| 2,776,472 A | | 1/1957 | Mesick, Jr. |
| 4,358,892 A | * | 11/1982 | Turillon .................. H01M 4/14 29/623.1 |
| 6,528,033 B1 | | 3/2003 | Barker et al. |
| 8,092,941 B2 | | 1/2012 | Weppner et al. |
| 8,105,718 B2 | | 1/2012 | Nakanishi et al. |
| 8,481,208 B2 | | 7/2013 | Riley, Jr. et al. |
| 8,658,125 B2 | | 2/2014 | Ohzuku et al. |
| 8,658,317 B2 | | 2/2014 | Weppner et al. |
| 8,753,779 B2 | | 6/2014 | Gao et al. |
| 8,841,033 B2 | | 9/2014 | Yamamura et al. |
| 9,257,717 B2 | | 2/2016 | Muraoka et al. |
| 9,257,721 B2 | | 2/2016 | Baba et al. |
| 9,287,563 B2 | | 3/2016 | Cho et al. |
| 9,577,294 B2 | | 2/2017 | Iwase |
| 9,608,272 B2 | | 3/2017 | Loveridge et al. |
| 9,653,734 B2 | | 5/2017 | Liu et al. |
| 9,660,273 B2 | | 5/2017 | Bierschenk et al. |
| 2007/0172739 A1 | | 7/2007 | Visco et al. |
| 2012/0308880 A1 | * | 12/2012 | Duh ...................... H01M 4/131 429/188 |
| 2013/0108920 A1 | | 5/2013 | Oladeji |
| 2014/0287305 A1 | * | 9/2014 | Wachsman .......... H01M 10/052 429/211 |
| 2015/0099188 A1 | * | 4/2015 | Holme .............. H01M 10/0525 429/231.95 |
| 2015/0099211 A1 | | 4/2015 | Bierschenk et al. |
| 2017/0121807 A1 | | 5/2017 | Deng et al. |

OTHER PUBLICATIONS

Murugan, et al., Fast Lithium Ion Conduction in Garnet-Type Li7La3Zr2O12, Angew. Chem. Int. Ed., 2007, 46:7778-7781.

Orikasa, et al., Ionic Conduction in Lithium Ion Battery Composite Electrode Governs Cross-Sectional Reaction Distribution, Scientific Reports, 2016, 6:26382, 6 pages.

Rangasamy, et al., The Effect of 24c-site (A) Cation Substitution on the Tetragonal-Cubic Phase Transition in Li7_xLa3_xAxZr2O12 Garnet-Based Ceramic Electrolyte, Journal of Power Sources, 2013, 230:261-266.

Thangadurai, et al, Li6ALa2Ta2O12 (a=Sr, Ba): Novel Garnet-Like Oxides for Fast Lithium Ion Conduction, Advanced Functional Materials, 2005, 15(1)107-112.

Thangadurai, et al., Recent Progress in Solid Oxide and Lithium Ion Conducting Electrolytes Research, Ionics, 2006, 12:81-92.

Thompson, et al., A Tale of Two Sites: On Defining the Carrier Concentration in Garnet-Based Ionic Conductors for Advanced Li Batteries, Advanced Energy Materials, 2015, 1500096, 9 pages.

Xu, et al., Mechanisms of Li+ Transport in Garnet-Type Cubic Li3+xLa3M2O12 (M = Te, Nb, Zr), Physical Review B, 2012, 85:052301, 5 pages.

Ohta, et al., Co-Sinterable Lithium Garnet-Type Oxide Electrolyte with Cathode for All-Solid-State Lithium Ion Battery, Journal of Power Sources, 2014, 265:40-44.

Van Den Broek, et al., Interface-Engineered All-Solid-State Li-Ion Batteries Based on Garnet-Type Fast Li+ Conductors, Advanced Energy Materials, 2016, 6:1600736, 11 pages.

PCT International Search Report and Written Opinion, PCT/US2017/058222, dated Jan. 5, 2018.

\* cited by examiner

METAL INFILTRATED ELECTRODES FOR SOLID STATE BATTERIES

CROSS-REFERENCES TO RELATED APPLICATIONS

This application claims priority to U.S. Patent Application No. 62/412,965 filed Oct. 26, 2016.

STATEMENT REGARDING FEDERALLY SPONSORED RESEARCH

This invention was made with government support under grant DE-AR0000653 awarded by the Department of Energy. The government has certain rights in the invention.

BACKGROUND OF THE INVENTION

1. Field of the Invention

This invention relates to electrochemical devices, such as lithium ion battery electrodes, lithium ion conducting solid-state electrolytes, and solid-state lithium ion batteries including these electrodes and solid-state electrolytes. This invention also relates to methods for making such electrochemical devices. In particular, the invention relates to metal infiltrated electrodes for solid state electrochemical devices.

2. Description of the Related Art

Lithium ion (Li-ion) battery technology has advanced significantly and has a market size projected to be $10.5 billion by 2019. Current state of the art lithium ion batteries comprise two electrodes (an anode and a cathode), a separator material that keeps the electrodes from touching but allows $Li^+$ ions through, and an electrolyte (which is an organic liquid with lithium salts). During charge and discharge, $Li^+$ ions are exchanged between the electrodes.

State-of-the-art (SOA) Li-ion technology is currently used in low volume production plug-in hybrid and niche high performance vehicles; however, widespread adoption of electrified powertrains requires 25% lower cost, four times higher performance, and safer batteries without the possibility of fire. Thus, future energy storage demands safer, cheaper and higher performance means of energy storage.

One strategy is to develop solid state batteries, where the liquid electrolyte is replaced with a solid material that is conductive to $Li^+$ ions and can offer 3-4 times the energy density while reducing the battery pack cost by about 20%. Despite these attractive features, the fabrication and testing of solid state batteries for bulk scale applications, such as electric vehicles, has not been demonstrated.

Currently, the liquid electrolyte used in SOA Li-ion batteries is not compatible with advanced battery concepts, such as the use of a lithium metal anode or high voltage cathodes. Furthermore, the liquid utilized in SOA Li-ion batteries is flammable and susceptible to combustion upon thermal runaway. The use of a solid electrolyte to replace the liquid used in the SOA enables advanced cell chemistries while simultaneously eliminating the risk of combustion. Several solid-electrolytes have been identified including nitrogen doped lithium phosphate (LiPON) or sulfide based glasses, and companies have been formed to commercialize these types of technologies. While progress has been made towards the performance of cells of these types, large scale manufacturing has not been demonstrated since LiPON must be vapor deposited and sulfide glasses form toxic $H_2S$ upon exposure to ambient air. Thus, special manufacturing techniques are required for those systems.

Super conducting oxides (SCO) have also been proposed for use in a solid-state electrolyte. Although several oxide electrolytes are reported in the literature, selection of a particular material is not trivial since several criteria must be simultaneously satisfied. The following metrics were identified on a combination of the SOA Li-ion battery technology baseline: (1) conductivity>0.2 mS/cm, comparable to SOA Li-ion battery technology, (2) negligible electronic conductivity, (3) electrochemical stability against high voltage cathodes and lithium metal anodes, (4) high temperature stability, (5) reasonable stability in ambient air and moisture, and (6) ability to be manufactured at a thicknesses of <50 microns. Until recently, no SCO simultaneously met the above criteria.

In 2007, high Li ion conductivity in the garnet family of super conducting oxides was identified [see, Thangadurai, et al., *Adv. Funct. Mater.* 2005, 15, 107; and Thangadurai, et al., *Ionics* 2006, 12, 81], maximizing with the SCO garnet based on $Li_7La_3Zr_2O_{12}$ (LLZO) [see, Murugan, et al., *Angew. Chem. Inter. Ed.* 2007, 46, 7778]. Since then, it has been shown that LLZO can meet all of the criteria necessary for a solid-electrolyte outlined above.

Several compositions in the garnet family of materials are known to exhibit Li-ion conduction with the general formula $Li_{3+a}M_2Re_3O_{12}$ (where a=0-3, M=a metal with +4, +5, or +6 valence, and Re=a rare earth element with a +3 valence) [see, Xu, et al., *Phys. Rev. B* 2012, 85, 052301]. T. Thompson, A. Sharafi, M. D. Johannes, A. Huq, J. L. Allen, J. Wolfenstine, J. Sakamoto, *Advanced Energy Materials* 2015, 11, 1500096, identified which compositions, based on Li content, exhibit maximal Li-ionic conductivity. LLZO is a particularly promising family of garnet compositions. Several strategies for increasing the conductivity of LLZO including: (1) doping with elements such as Al, Fe, Y, Ga, Ba, and Ca, and (2) forming solid solutions with other garnet families such as LLTO ($Li_5La_3Ta_2O_{12}$) and LLNO ($Li_5La_3Nb_2O_{12}$) have been identified [see Thompson, et al., *Advanced Energy Materials* 2015, 11, 1500096]. Both of the mechanisms mentioned (doping and solid solutions) rely on substitution on the Li and/or M site. Substitution on the Re site has also been attempted [see, E. Rangasamy, J. Wolfenstine, J. L. Allen, J. Sakamoto, *Journal of Power Sources* 2013, 230, 261] but both experimental and computational previous reports suggest this site is especially stable and has met limited success [see, S. Mukhopadhyay, T. Thompson, J. Sakamoto, A. Huq, J. Wolfenstine, J. L. Allen, N. Bernstein, D. A. Stewart, M. D. Johannes, *Chemistry of Materials* 2015, 27, 3658.].

From the above discussion, it is evident that a large number of elements can be substituted on the garnet crystal structure. Similarly, Li-ion cathode and anode materials can be comprised of several cations, including dopants. Finally, conductive additives in the electrodes can be comprised of carbons, metals, or other ceramic phases. Thus, many cations mixed together in a composite cathode structure complicates the fabrication during sintering. Often, the discrete mixture phases formed before sintering react with each other, changing the electrochemical properties of the composite cathode after sintering. Therefore, over-chemical reaction of the composite electrode constituents must be avoided. However, a complete lack of chemical reaction between the constituents would result in poor electrochemical interfaces. Thus, a balance in the chemical reaction between the composite cathode constituents must be achieved. Also, conventional infiltration methods rely on first forming a solid electrolyte structure and then infiltrating the structure with the remaining composite electrode constituents with a carrier such as a polymer. This approach will not form the required electrochemical connection.

What is needed therefore is a method for balancing the chemical reactions in formation processes for electrodes for solid state electrochemical devices such that improved electrochemical properties of the electrodes after sintering can be achieved. In particular, there is a need for a composite electrode with one or more separate phases within the electrode that provide electronic and/or ionic conduction pathways in the electrode active material phase.

SUMMARY OF THE INVENTION

The foregoing needs can be addressed by a method for forming an electrode in which a metal is infiltrated into the pore space of the active material of the electrode providing improved electronic conductivity to the electrode. The electrode may also include a solid-state ion conducting material providing improved ion conductivity to the electrode. Before infiltration of the metal, a stabilization coating may be applied to the active material and/or the solid-state ion conducting material to the stabilize electrode interfaces by slowing, but not eliminating, the chemical reactions that occur at elevated temperatures during sintering of the active material and/or the solid-state ion conducting material forming the electrode.

This disclosure includes an approach employing a two-step process. The first step chemically bonds the solid-state ion conducting material and electrode active material phases at high temperatures such that ionic connection with the active material is achieved and interconnected porosity is maintained. Second, a low melting point metal or alloy is infiltrated into the pore space of the porous structure created in the first step. Coating methods can be concurrently utilized with this process during the first high temperature step or before the metal infiltration step.

One advantage of the two-step electrode formation method developed is to control the inherent chemical reactions which occur between mixtures during elevated temperature processing of oxide based solid-state battery electrodes. In an example approach disclosed here, a two-step approach is used. First, the oxide based solid-state ion conducting material and the active material are blended and exposed to high temperatures. The elevated temperatures chemically bond the two phases together but an interconnected pore structure remains. In this manner, ionic connection of the active material can be made. In the second step, a low melting point metal is infiltrated into the open pore volume in the electrode that was maintained during the first high temperature process. The metallic phase provides electronic connection with the electrode active material. Combined with the ionic connection provided in the first high temperature step, electrochemical connection of the active material to the cell is achieved.

Wetting of oxide surfaces with molten metals can be problematic. To better infiltrate the porous oxide structure with the molten metal, the surface of the skeletal electrode structure can be chemically modified. Coating methods can additionally be utilized with the method of this disclosure. For example, the active material and/or the solid electrolyte can be coated prior to the first high temperature step to stabilize the interface and improve wetting. Additionally, a coating can be applied to the resulting porous structure of the electrode after the first high temperature step and before the second metal infiltration step. Second, a flux like those used in soldering or brazing (e.g., ammonium chloride, zinc chloride, borax) can be introduced on the skeletal electrode surface to help the molten metal wet the oxide surface. The flux can be introduced during or after the first heat treatment processes to the skeletal electrode structure. Third, the oxide skeletal structure can be partially or fully reduced to increase the metallic nature at the surface. This can be accomplished after the first heat treatment step which forms the skeletal electrode structure by additionally heating in any reducing environment (e.g., hydrogen). Alternatively, the gas environment during the heat treatment to form the skeletal electrode structure can be switched from (first) oxidizing (e.g., oxygen) or inert (e.g., argon) to (second) reducing (e.g., hydrogen) without changing the temperature. Finally, the surface can be reduced with a chemical agent (e.g., compounds containing iron ions or tin ions) at room temperature.

Since this approach relies on the application of temperature to bond the solid electrolyte and active material, but not densify, lower temperatures can be utilized. This means that chemical reactions which will occur at temperatures required to bond and simultaneously densify can be avoided. A dense electrode does result after the metal infiltration step but at much lower temperatures. Furthermore, the interconnected metal network provides mechanical robustness for the resulting composite electrode.

In another aspect, the invention provides a microstructure where a porous skeletal network of a composite electrode can be infiltrated with a low melting point metal. The low melting point metal can be selected from Zn, Mg, Sn, Bi, Pb, Sb, In, Ga, Al, or mixtures or alloys thereof. In a preferred embodiment, the melting point of the metal is less than the temperature required to form the porous structure. Furthermore, the low melting point metal can be selected from any metal compatible to high potentials (i.e., greater than 2.5 volts) and oxidative environments associated with cathodes in electrochemical devices. In a preferred embodiment, the oxide based solid-state ion conducting material is mixed with an active material where the mixture is brought to an elevated temperature to form a porous structure. The porous structure of the electrode is then infiltrated with a metal. The porosity during the elevated temperature step is interconnected, and has a 5% by volume or greater porosity. The electrode can comprise a cathode in a solid state battery. The cathode can further comprise a composite containing an active material and a solid-state lithium ion conducting material. In some embodiments, the solid-state lithium ion conducting material can be an oxide, garnet, or LLZO structure.

In another aspect, the invention provides a method for forming the skeletal electrode structure, chemically modifying the pore surfaces to increase the wetting with a molten metal, and infiltrating the resulting electrode porous structure with a molten metal. In some embodiments of the present invention, the porous electrode can be modified prior to metal infiltration to increase wetting. The modification step can comprise a coating deposited by sol-gel or any vapor deposition technique. In other embodiments, the modification step can comprise a heat treatment in a reducing environment resulting in an increased metallic nature of the surface. The modification step can also comprise a chemical treatment to reduce the electrode surface near room temperature resulting in an increased metallic nature.

In another aspect, the invention provides a battery structure comprised of an anode, a solid state electrolyte, and a cathode wherein the anode can comprise lithium metal, the solid state electrolyte can comprise an oxide, and the cathode can comprise a porous skeletal structure that has been infiltrated with a metal. The solid state electrolyte can comprise a garnet or LLZO structure.

These and other features, aspects, and advantages of the present invention will become better understood upon consideration of the following detailed description, drawings and appended claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE INVENTION

Figure 1:
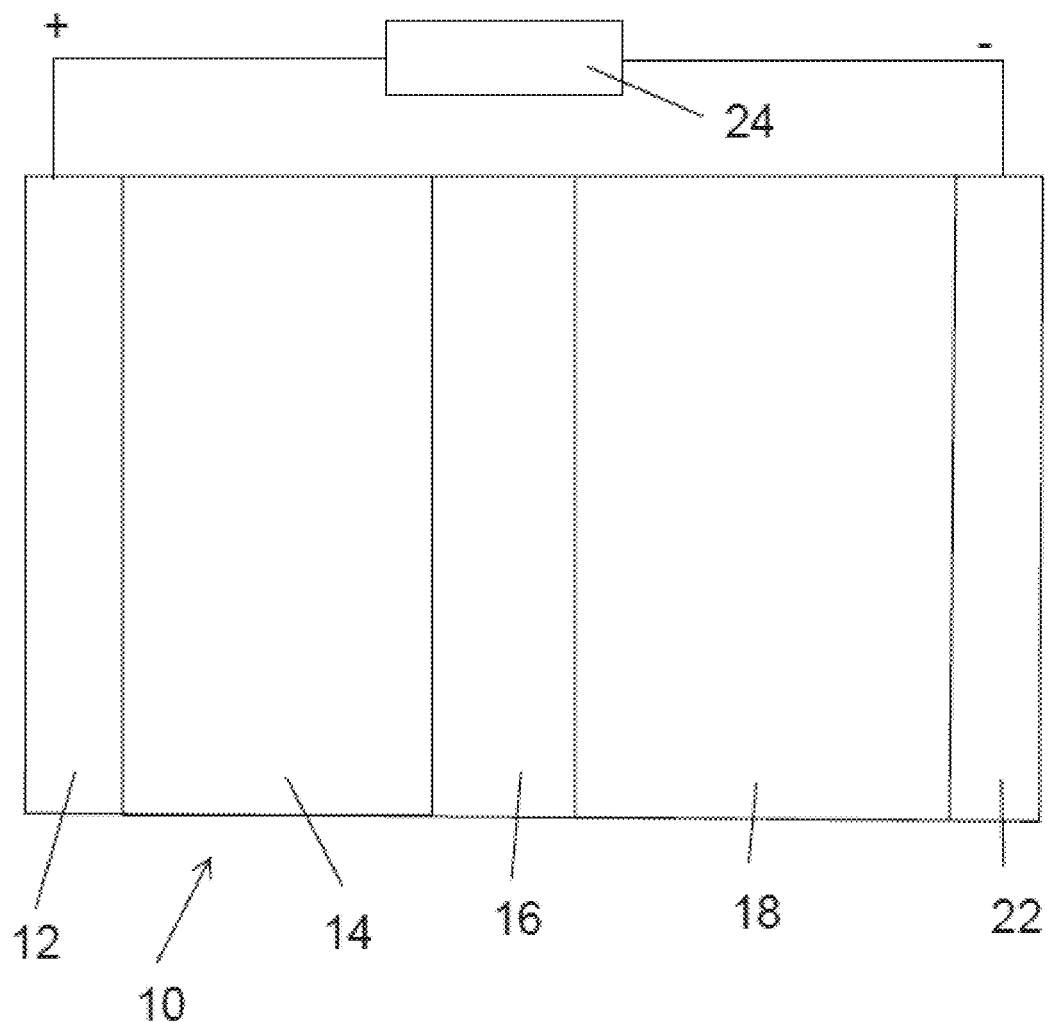
FIG. 1 is a schematic of a lithium ion battery.

In one non-limiting example application, a cathode including infiltrated metal and/or an anode including infiltrated metal according to embodiments of the invention can be used in a lithium ion battery as depicted in FIG. 1. The lithium ion battery 10 of FIG. 1 includes a current collector 12 (e.g., aluminum) in contact with a cathode 14. A solid state electrolyte 16 is arranged between the cathode 14 and an anode 18, which is in contact with a current collector 22 (e.g., aluminum). The current collectors 12 and 22 of the lithium ion battery 10 may be in electrical communication with an electrical component 24. The electrical component 24 could place the lithium ion battery 10 in electrical communication with an electrical load that discharges the battery or a charger that charges the battery.

A suitable active material for the cathode 14 of the lithium ion battery 10 is a lithium host material capable of storing and subsequently releasing lithium ions. An example cathode active material is a lithium metal oxide wherein the metal is one or more aluminum, cobalt, iron, manganese, nickel and vanadium. Non-limiting example lithium metal oxides are $LiCoO_2$ (LCO), $LiFeO_2$, $LiMnO_2$ (LMO), $LiMn_2O_4$, $LiNiO_2$ (LNO), $LiNi_xCo_yO_2$, $LiMn_xCo_yO_2$, $LiMn_xNi_yO_2$, $LiMn_xNi_yO_4$, $LiNi_xCo_yAl_zO_2$, $LiNi_{1/3}Mn_{1/3}Co_{1/3}O_2$ (NMC) and others. Another example of cathode active materials is a lithium-containing phosphate having a general formula $LiMPO_4$ wherein M is one or more of cobalt, iron, manganese, and nickel, such as lithium iron phosphate (LFP) and lithium iron fluorophosphates. Many different elements, e.g., Co, Mn, Ni, Cr, Al, or Li, may be substituted or additionally added into the structure to influence electronic conductivity, ordering of the layer, stability on delithiation and cycling performance of the cathode materials. The cathode active material can be a mixture of any number of these cathode active materials.

A suitable active material for the anode 18 of the lithium ion battery 10 is a lithium host material capable of incorporating and subsequently releasing the lithium ion such as graphite, a lithium metal oxide (e.g., lithium titanium oxide), hard carbon, a tin/cobalt alloy, or silicon/carbon. The anode active material can be a mixture of any number of these anode active materials.

A suitable solid state electrolyte 16 of the lithium ion battery 10 includes an electrolyte material having the formula $Li_uRe_vM_wA_xO_y$, wherein:

Re can be any combination of elements with a nominal valance of +3 including La, Nd, Pr, Pm, Sm, Sc, Eu, Gd, Tb, Dy, Y, Ho, Er, Tm, Yb, and Lu;

M can be any combination of metals with a nominal valance of +3, +4, +5 or +6 including Zr, Ta, Nb, Sb, W, Hf, Sn, Ti, V, Bi, Ge, and Si;

A can be any combination of dopant atoms with nominal valance of +1, +2, +3 or +4 including H, Na, K, Rb, Cs, Ba, Sr, Ca, Mg, Fe, Co, Ni, Cu, Zn, Ga, Al, B, and Mn;

u can vary from 3-7.5;

v can vary from 0-3;

w can vary from 0-2;

x can vary from 0-2; and y can vary from 11-12.5.

In one non-limiting example embodiment of the invention, the solid state electrolyte comprises an electrolyte material having the chemical formula: $Li_{6.25}La_{2.7}Zr_2Al_{0.25}O_{12}$.

Figure 2:
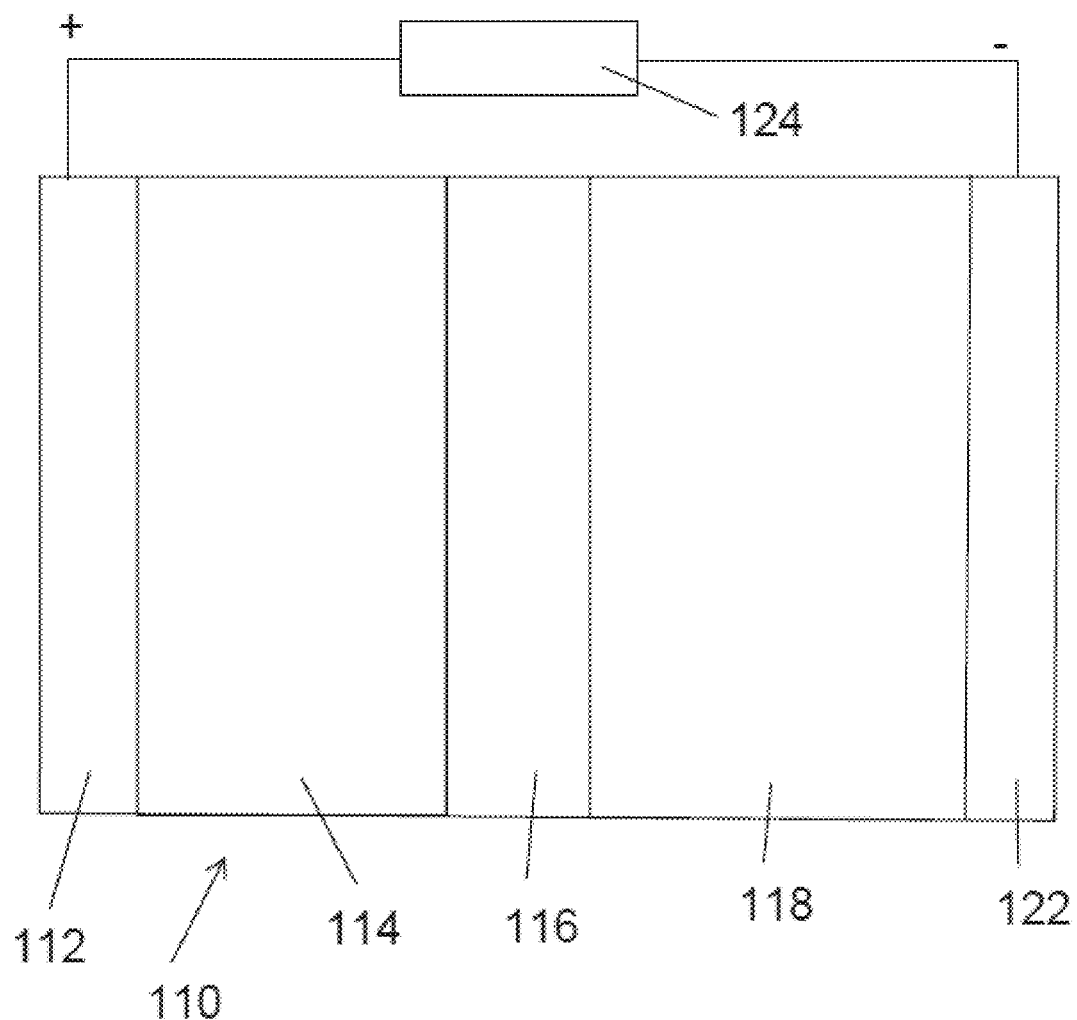
FIG. 2 is a schematic of a lithium metal battery.

In another non-limiting example application, a cathode including infiltrated metal according to embodiments of the invention can be used in a lithium metal battery as depicted in FIG. 2. The lithium metal battery 110 of FIG. 2 includes a current collector 112 in contact with a cathode 114. A solid state electrolyte 116 is arranged between the cathode 114 and an anode 118, which is in contact with a current collector 122. The current collectors 112 and 122 of the lithium metal battery 110 may be in electrical communication with an electrical component 124. The electrical component 124 could place the lithium metal battery 110 in electrical communication with an electrical load that discharges the battery or a charger that charges the battery. A suitable active material for the cathode 114 of the lithium metal battery 110 is one or more of the lithium host materials listed above, or porous carbon (for a lithium air battery), or a sulfur containing material (for a lithium sulfur battery). A suitable active material for the anode 118 of the lithium metal battery 110 is lithium metal. A suitable solid state electrolyte material for the solid state electrolyte 116 of the lithium metal battery 110 is one or more of the solid state electrolyte materials listed above.

The present invention provides embodiments of an electrode that provide improved electronic and ionic conduction pathways in the electrode active material phase (e.g., lithium host material) of a cathode and/or an anode suitable for use in the lithium ion battery 10 of FIG. 1 or a cathode suitable for use in the lithium metal battery 110 of FIG. 2. The cathode and/or the anode may comprise a solid-state ion conducting material. The solid-state ion conducting material is selected from the group consisting of any combination oxide or phosphate materials with the garnet, perovskite, polymers, NaSICON, or LiSICON phase. In one non-limiting example embodiment, the solid-state ion conducting material used in the electrode is a solid-state lithium ion conducting material having the formula $Li_uRe_vM_wA_xO_y$, wherein:

Re can be any combination of elements with a nominal valance of +3 including La, Nd, Pr, Pm, Sm, Sc, Eu, Gd, Tb, Dy, Y, Ho, Er, Tm, Yb, and Lu;

M can be any combination of metals with a nominal valance of +3, +4, +5 or +6 including Zr, Ta, Nb, Sb, W, Hf, Sn, Ti, V, Bi, Ge, and Si;

A can be any combination of dopant atoms with nominal valance of +1, +2, +3 or +4 including H, Na, K, Rb, Cs, Ba, Sr, Ca, Mg, Fe, Co, Ni, Cu, Zn, Ga, Al, B, and Mn;

u can vary from 3-7.5;

v can vary from 0-3;

w can vary from 0-2;

x can vary from 0-2; and y can vary from 11-12.5.

In one non-limiting example version of the electrode, the solid-state ion conducting material has the formula $Li_7La_3Zr_2O_{12}$. The solid-state ion conducting material can have a lithium ion conductivity that is greater than $10^{-5}$ S/cm at 23° C. The solid-state ion conducting material can have a lithium ion conductivity that is greater than $10^{-4}$ S/cm at 23° C.

The present invention also provides embodiments of an electrode having a stabilization coating in contact with the porous structure of the electrode and the metallic material infiltrated in the electrode. The stabilization coating may comprise one or more oxides selected from boron oxide, zinc oxide, magnesium oxide, phosphorus oxide, strontium oxide, calcium oxide, barium oxide, yttrium oxide, or silicon oxide. Non-limiting examples include $B_2O_3$, $SiO_2$, $P_2O_5$, and mixtures thereof. Other suitable stabilization coatings include oxides that have a low solubility in the solid state electrolyte, e.g., LLZO, perovskite, or NaSICON phases.

As used herein, the term "stabilization coating" means a coating on a constituent in which the constituent is designed to be sintered to at least one other constituent (which may be the same or different), wherein the coating slows but does not eliminate, diffusion of the constituent into or chemical reactions of the constituent with the other constituent(s). For example, the stabilization coating may act as a diffusion inhibitor to prevent undesirable changes in electrochemical properties caused by high levels of interdiffusion of the constituents with one another, while still enabling the formation of a sinter bond among the constituents.

Methods for Forming an Electrode or an Electrochemical Device

The invention provides a method for forming an electrode for an electrochemical device. The method may comprise: (a) forming a mixture comprising a lithium host material and a solid-state ion conducting material; (b) sintering the mixture such that a porous structure is formed; and (c) infiltrating the porous structure with a metallic material. In one version, the method comprises casting a slurry including the mixture on a surface to form a layer, and sintering the layer.

The invention provides a method for forming an electrochemical device. The method may comprise: (a) casting a first slurry on a surface to form a first layer, wherein the first slurry comprises a lithium host material; (b) sintering the first layer such that a porous structure is formed; (c) infiltrating the porous structure with a metallic material; and (d) casting a second slurry on the first layer to form a second layer on the first layer, wherein the second slurry comprises a solid electrolyte material; and (e) sintering the second layer.

The invention provides a method for forming an electrochemical device. The method may comprise: (a) casting a first slurry on a surface to form a first layer, wherein the first slurry comprises a solid electrolyte material; (b) sintering the first layer; (c) casting a second layer on the first layer, wherein the second layer comprises a lithium host material; (d) sintering the second layer such that a porous structure is formed; and (e) infiltrating the porous structure with a metallic material.

In any of the methods for forming an electrode or an electrochemical device, the metallic material may be selected from the group consisting of Zn, Mg, Sn, Bi, Pb, Sb, In, Ga, Al, and mixtures or alloys thereof. These low melting point metals have melting points as follows: zinc (Zn) has a melting point of 419° C.; magnesium (Mg) has a melting point of 650° C.; tin (Sn) has a melting point of 231° C.; bismuth (Bi) has a melting point of 271° C.; lead (Pb) has a melting point of 327° C.; antimony (Sb) has a melting point of 630° C.; indium (In) has a melting point of 156° C.; gallium (Ga) has a melting point of 29° C.; and aluminum (Al) has a melting point of 660° C. The metallic material can have a melting point of less than 700° C., or less than 600° C., or less than 500° C., or less than 400° C., or less than 300° C., or less than 200° C. The metallic material can be resistant to a potential greater than 2.5 volts.

The porous structure formed in any of the methods for forming an electrode or an electrochemical device can have a porosity volume between 5% and 30%. Infiltration of the porous structure with the metallic material can be undertaken in a temperature range that is less than a temperature required to densify the porous structure. Infiltration of the porous structure with the metallic material can be undertaken without the use of a polymeric carrier for the metallic material.

In any of the methods for forming an electrode or an electrochemical device, the solid-state ion conducting material in the electrode or the solid electrolyte material in the solid state electrolyte can be selected from the group consisting of any combination oxide or phosphate materials with the garnet, perovskite, polymers, NaSICON, or LiSICON phase. In one embodiment, the solid-state ion conducting material or the solid electrolyte material used in the method is a solid-state lithium ion conducting material having the formula $Li_uRe_vM_wA_xO_y$, wherein Re can be any combination of elements with a nominal valance of +3 including La, Nd, Pr, Pm, Sm, Sc, Eu, Gd, Tb, Dy, Y, Ho, Er, Tm, Yb, and Lu;

M can be any combination of metals with a nominal valance of +3, +4, +5 or +6 including Zr, Ta, Nb, Sb, W, Hf, Sn, Ti, V, Bi, Ge, and Si;

A can be any combination of dopant atoms with nominal valance of +1, +2, +3 or +4 including H, Na, K, Rb, Cs, Ba, Sr, Ca, Mg, Fe, Co, Ni, Cu, Zn, Ga, Al, B, and Mn;

u can vary from 3-7.5;

v can vary from 0-3;

w can vary from 0-2;

x can vary from 0-2; and y can vary from 11-12.5.

In one non-limiting example version of the methods, the solid-state ion conducting material or the solid electrolyte material has the formula $Li_7La_3Zr_2O_{12}$. The solid-state ion conducting material or the solid electrolyte material can have a lithium ion conductivity that is greater than $10^{-5}$ S/cm at 23° C. The solid-state ion conducting material or the solid electrolyte material can have a lithium ion conductivity that is greater than $10^{-4}$ S/cm at 23° C.

The methods for forming an electrode or an electrochemical device can be used to form a cathode or an anode. In one non-limiting example version of the methods, the electrode is a cathode for a lithium ion battery, and the lithium host material is selected from the group consisting of lithium metal oxides wherein the metal is one or more aluminum, cobalt, iron, manganese, nickel and vanadium, and lithium-containing phosphates having a general formula LiMPO$_4$ wherein M is one or more of cobalt, iron, manganese, and nickel. In one non-limiting example version of the methods, the electrode is a cathode for a lithium ion battery, and the lithium host material is selected from the group consisting of lithium nickel manganese cobalt oxides. In one non-limiting example version of the methods, the electrode is an anode for a lithium ion battery, and the lithium host material is selected from the group consisting of graphite, lithium titanium oxides, hard carbon, tin and cobalt alloy, or silicon and carbon.

The methods for forming an electrode or an electrochemical device may further comprise applying a stabilization coating to powdered lithium host material and/or powdered solid-state ion conducting material before sintering the mixture. The method may further comprise applying a stabilization coating to the sintered porous structure such that the stabilization coating stabilizes an interface between the porous structure and the metallic material and improves wetting between the porous structure and the metallic material. The stabilization coating can be applied using sol-gel wet chemistry, atomic layer deposition, chemical vapor deposition, or physical vapor deposition. The stabilization coating can be applied using a flux method.

The stabilization coating may comprise one or more oxides selected from boron oxide, zinc oxide, magnesium oxide, phosphorus oxide, strontium oxide, calcium oxide, barium oxide, yttrium oxide, or silicon oxide. Non-limiting examples include $B_2O_3$, $SiO_2$, $P_2O_5$, and mixtures thereof. Other suitable stabilization coatings include oxides that have a low solubility in the solid state electrolyte, e.g., LLZO, perovskite, or NaSICON phases.

In some embodiments, the stabilization coating may be applied as an oxide precursor that decomposes to one or more oxides upon thermal treatment. Suitable oxide precursors include inorganic metal salts and organic metal salts that contain a salt capable of undergoing thermal decomposition, such as nitrate, carbonate, sulfate, hydroxide, alkoxide, carboxylate, ß-diketonate, or the like. Non-limiting examples of inorganic metal salts and organic salts include magnesium methoxide, strontium acetate, zinc acetate, triisopropyl borate, methyltrimethoxy silane, barium acetate, yttrium acetate, calcium acetate, and the like. When the coating is applied as a part of a slurry additive or to a dried slurry cast film, the thermal decomposition of the coating precursors could coincide with the binder burnout step of the electrode film.

The method may further comprise heat treating the porous structure in a reducing environment (e.g., hydrogen) resulting in an increased metallic nature of a surface of the porous structure before infiltrating the porous structure with the metallic material. The method may further comprise chemically treating the porous structure to reduce a surface of the porous structure resulting in an increased metallic nature of the surface of the porous structure before infiltrating the porous structure with the metallic material. Non-limiting example recuing agents are compounds containing iron ions or tin ions.

The slurry to be cast to form the porous structure of the electrode may include optional components. For example, the slurry may optionally include one or more sintering aids which melt and form a liquid that can assist in sintering of a cast slurry formulation of the invention via liquid phase sintering. Example sintering aids can be selected from boric acid, boric acid salts, boric acid esters, boron alkoxides phosphoric acid, phosphoric acid salts, phosphate acid esters, silicic acid, silicic acid salts, silanols, silicon alkoxides, aluminum alkoxides and mixtures thereof.

The slurry may optionally include a dispersant. One purpose of the dispersant is to stabilize the slurry and prevent the suspended active battery material particles from settling out. The dispersant may be selected from the group consisting of salts of lithium and a fatty acid. The fatty acid may be selected from lauric acid, myristic acid, palmitic acid, stearic acid, oleic acid, linoleic acid, linolenic acid, arachidic acid, and behenic acid.

The slurry may optionally include a plasticizer. The purpose of the plasticizer is to increase the workability of the as-cast tape. Preferably, the plasticizer is a naturally derived plant based oil. The plasticizer may be selected from the group consisting of coconut oil, castor oil, soybean oil, palm kernel oil, almond oil, corn oil, canola oil, rapeseed oil, and mixtures thereof.

The slurry formulation may optionally include a binder. Non-limiting examples of the binder include: poly(methylmethacrylate), poly(vinylacetate), polyvinyl alcohol, polyethyleneoxide, polyvinylpyrrolidone, polyvinyl ether, polyvinylchloride, polyacrylonitrile, polyvinylpyridine, styrene-butadiene rubber, acrylonitrile-butadiene rubber, polyethylene, polypropylene, ethylene-propylene-diene ter-polymers (EPDM), cellulose, carboxymethylcellulose, starch, hydroxypropylcellulose, and mixtures thereof. The binder is preferably a non-fluorinated polymeric material.

The slurry may optionally include a solvent is useful in a slurry formulation to dissolve the binder and act as a medium for mixing the other additives. Any suitable solvents may be used for mixing the active battery material particles, dispersant, and binder into a uniform slurry. Suitable solvents may include alkanols (e.g., ethanol), nitriles (e.g., acetonitrile), alkyl carbonates, alkylene carbonates (e.g., propylene carbonate), alkyl acetates, sulfoxides, glycol ethers, ethers, N-methyl-2-pyrrolidone, dimethylformamide, dimethylacetamide, tetrahydrofuran, or a mixture of any of these solvents.

The slurry formulation may include other additives. For example, the cathode or anode active battery material particles may be mixed with other particles, such as conductive particles. Any conductive material may be used without particular limitation so long as it has suitable conductivity without causing chemical changes in the fabricated battery. Examples of conductive materials include graphite; carbon blacks such as carbon black, acetylene black, Ketjen black, channel black, furnace black, lamp black and thermal black; conductive fibers such as carbon fibers and metallic fibers; metallic powders such as aluminum powder and nickel powder; conductive whiskers such as zinc oxide and potassium titanate; conductive metal oxides such as titanium oxide; and polyphenylene derivatives.

Any suitable method may be used to mix the slurry components into a uniform slurry. Suitable mixing methods may include sonication, mechanical stirring, physical shaking, vortexing, ball milling, and any other suitable means.

After the uniform slurry is obtained, the formulation is cast on a substrate surface to form a cast tape layer. The substrate may include any stable and conductive metals suitable as a current collector for the battery. A suitable metallic substrate may include aluminum, copper, silver, iron, gold, nickel, cobalt, titanium, molybdenum, steel, zirconium, tantalum, and stainless steel. In one embodiment, the metal substrate is aluminum.

The slurry layer cast on the surface may have a thickness in the range of a few micrometers to a few centimeters. In one embodiment, the thickness of the cast slurry layer is in the range of 10 micrometers to 150 micrometers, preferably 10 micrometers to 100 micrometers. After the slurry is cast on the substrate surface to form a tape, the green tape can be dried and then sintered in a temperature range of 300° C. to 1300° C., or 600° C. to 1200° C., or more preferably 700° C. to 1000° C., to form the porous structure of the electrode having a thickness in the range of 10 micrometers to 150 micrometers, preferably 20 micrometers to 100 micrometers, more preferably 50 micrometers to 100 micrometers. Optionally, multiple layers can be cast on top of one another. For example, the anode can be cast first on the metal substrate, followed by casting the solid electrolyte on the anode, and finally casting the cathode on the electrolyte. Alternatively, the cathode can be cast first on the metal substrate, followed by the solid electrolyte, and finally the anode. The multi-layer green tape can be dried and sintered to achieve the necessary electrochemical properties.

The following Example has been presented in order to further illustrate the invention and is not intended to limit the invention in any way.

Example

An oxide based solid-state lithium ion conducting material LLZO garnet and an active material $LiNi_{1/3}Mn_{1/3}Co_{1/3}O_2$ (NMC) were first blended together, and exposed to high temperatures (700° C.) to chemically bond the two phases together but an interconnected pore structure remained. A low melting point alloy, comprising Pb and Sn, was then infiltrated in liquid phase at 250° C. into the open pore volume of the porous active material/ion conducting material structure that was obtained in the first high temperature process.

Figure 3:
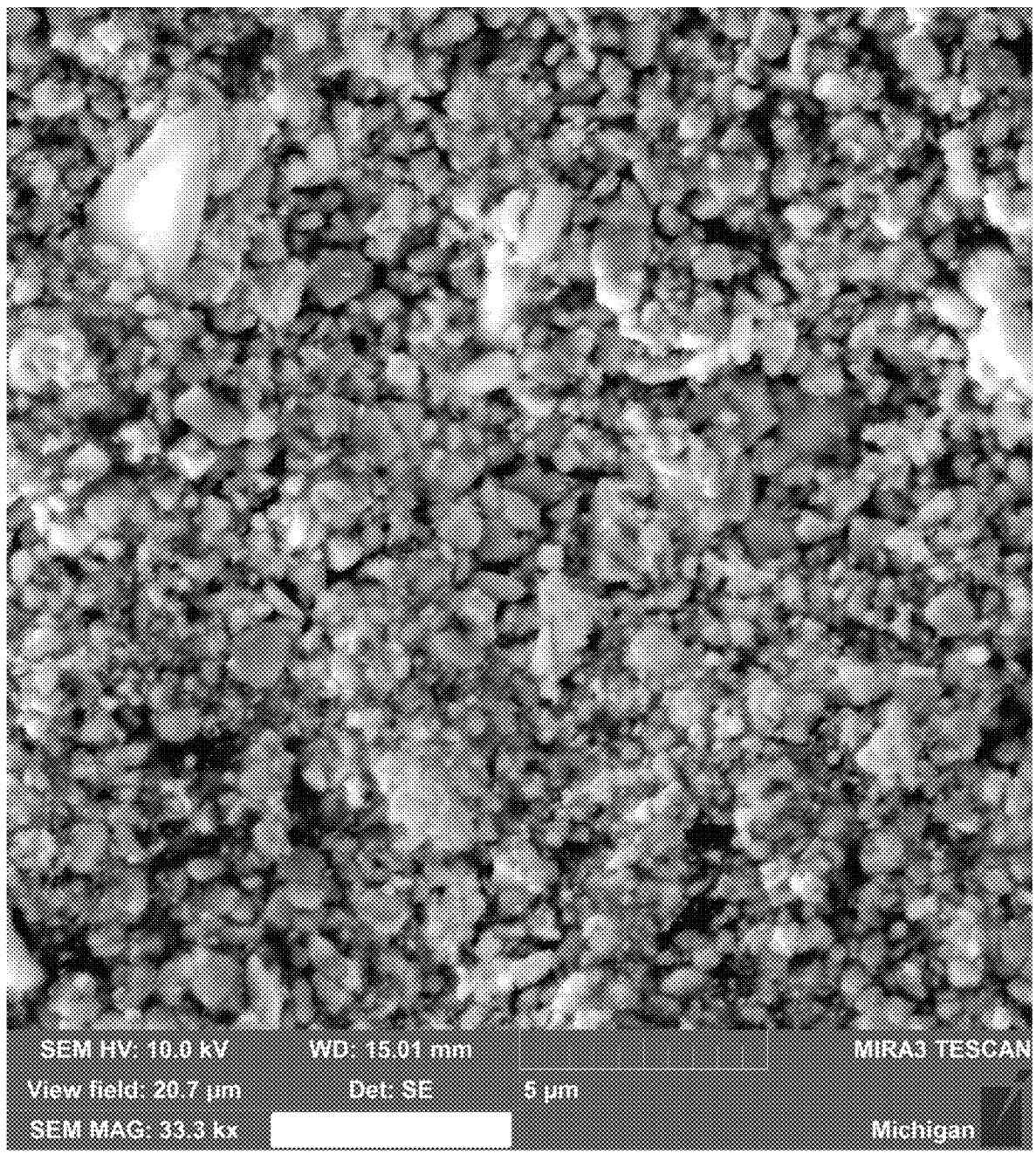
FIG. 3 is a secondary SEM micrograph of a porous composite cathode after metal infiltration.
Figure 4A:
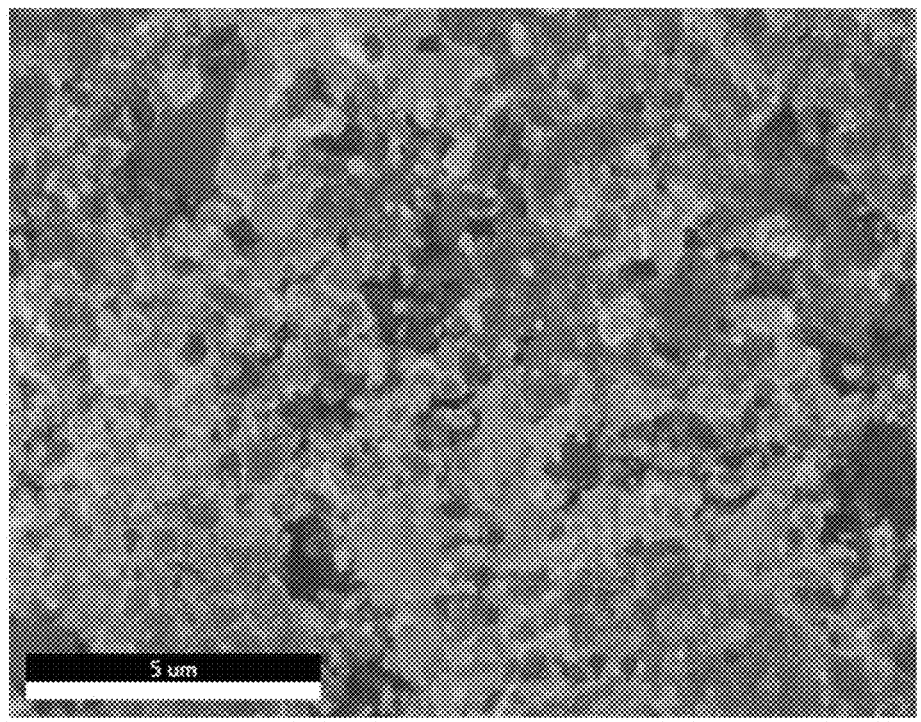
FIG. 4A is an elemental EDS mapping where blue corresponds to Zr and La (characteristic of the solid electrolyte), red corresponds to Co (characteristic of the active material), and green corresponds to Sn and Pb (characteristic of the infiltrated metallic material).
Figure 4B:
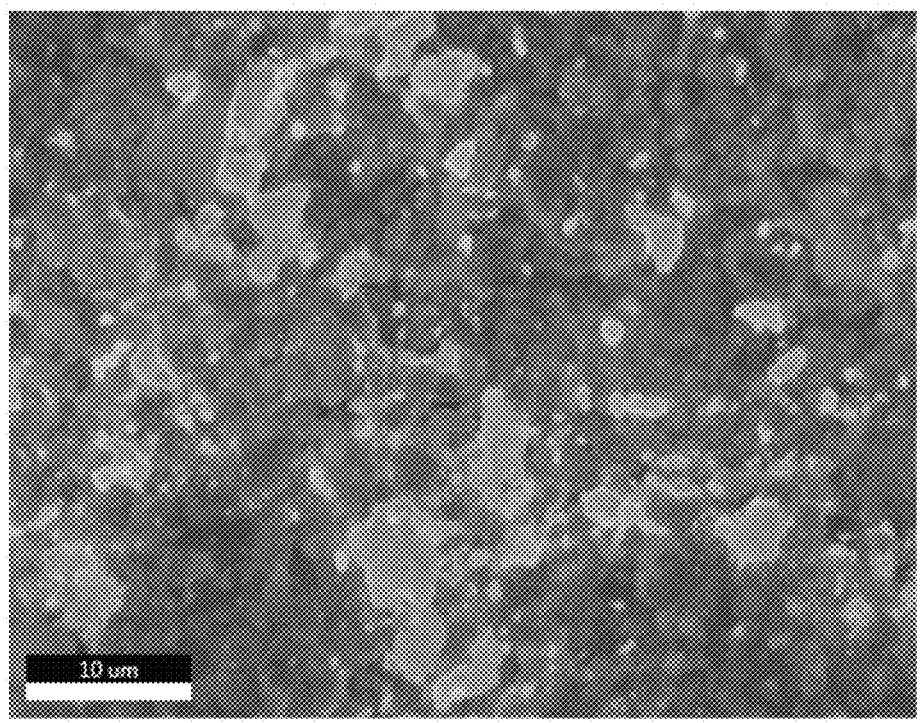
FIG. 4B is an elemental EDS mapping where blue corresponds to Zr, La, and Co (characteristic of the skeletal network), red corresponds to O (characteristic of the oxide materials), and green corresponds to Sn and Pb (characteristic of the infiltrated metallic material).

FIG. 3 shows a secondary SEM micrograph of the porous structure which has been infiltrated with an alloy of Pb and Sn indicating high apparent density and homogeneity after the infiltration process. However, the identity of each phase is not apparent in FIG. 3. FIG. 4A shows an EDS elemental map from the same area and shows the skeletal electrode microstructure (red and blue in FIG. 4A) infiltrated with metal (green in FIG. 4A) throughout the microstructure. In order to confirm the infiltrated metal remained metallic, the same area focused on mapping oxygen is shown in FIG. 4B. In FIG. 4B, the skeletal microstructure (blue) and oxygen (red) show overlap as expected since the constituents are oxides. However, the infiltrated metal (green) does not show significant overlap with oxygen (red) indicating that metallic nature was preserved.

Specifically, FIG. 4A shows an elemental EDS mapping where blue corresponds to Zr and La (characteristic of the solid electrolyte), red corresponds to Co (characteristic of the active material), and green corresponds to Sn and Pb (characteristic of the infiltrated metallic material). FIG. 4B shows an elemental EDS mapping where blue corresponds to Zr, La, and Co (characteristic of the skeletal network), red corresponds to O (characteristic of the oxide materials), and green corresponds to Sn and Pb (characteristic of the infiltrated metallic material).

REFERENCES

[1] DOE EERE Vehicle Technology Office, EV everywhere grand challenge: http://energy.gov/eere/vehicles/ev-everywhere-grand-challenge-does-10-year-vision-plug-electric-vehicles.
[2] V. Thangadurai, W. Weppner, *Adv. Funct. Mater.* 2005, 15, 107.
[3] V. Thangadurai, W. Weppner, *Ionics* 2006, 12, 81.
[4] R. Murugan, V. Thangadurai, W. Weppner, *Angew. Chem. Inter. Ed.* 2007, 46, 7778.
[5] M. Xu, M. S. Park, J. M. Lee, T. Y. Kim, Y. S. Park, E. Ma, *Phys. Rev. B* 2012, 85, 052301.
[6] T. Thompson, A. Sharafi, M. D. Johannes, A. Hug, J. L. Allen, J. Wolfenstine, Sakamoto, *Advanced Energy Materials* 2015, 11, 1500096.
[7] E. Rangasamy, J. Wolfenstine, J. L. Allen, J. Sakamoto, *Journal of Power Sources* 2013, 230, 261.
[8] S. Mukhopadhyay, T. Thompson, J. Sakamoto, A. Huq, J. Wolfenstine, J. L. Allen, N. Bernstein, D. A. Stewart, M. D. Johannes, *Chemistry of Materials* 2015, 27, 3658.
[9] Yamamura, Y., Hattori, T., Yoshida, T., Honda, A. and Sato, Y., NGK Insulators, Ltd., 2014. Ceramic material and preparation method therefor. U.S. Pat. No. 8,841,033.
[10] Weppner, W. and Thangadurai, V., 2012. U.S. Pat. No. 8,092,941, "Chemically stable solid lithium ion conductor".
[11] Weppner, W. and Murugan, R., U.S. Pat. No. 8,658,317, "Solid ion conductor which has a garnet-like crystal structure and has the stoichiometric composition $L_{7+X}A_XG_{3-X}Zr_2O_{12}$".

The citation of any document or reference is not to be construed as an admission that it is prior art with respect to the present invention.

Thus, the invention provides electrochemical devices, such as lithium ion battery electrodes, lithium metal battery electrodes, lithium ion conducting solid-state electrolytes, and solid-state lithium ion and lithium metal batteries including these electrodes and solid-state electrolytes. The invention provides a method for forming an electrode in which a metal is infiltrated into the pore space of the active material of the electrode providing improved electronic conductivity to the electrode. The electrode may also include a solid-state ion conducting material providing improved ion conductivity to the electrode. Before infiltration of the metal, a stabilization coating may be applied to the active material and/or the solid-state ion conducting material to the stabilize electrode interfaces by slowing, but not eliminating, the chemical reactions that occur at elevated temperatures during sintering of the active material and/or the solid-state ion conducting material forming the electrode. The solid state electrochemical devices have applications in electric vehicles, consumer electronics, medical devices, oil/gas, military, and aerospace.

Although the invention has been described in considerable detail with reference to certain embodiments, one skilled in the art will appreciate that the present invention can be practiced by other than the described embodiments, which have been presented for purposes of illustration and not of limitation. Therefore, the scope of the appended claims should not be limited to the description of the embodiments contained herein.

What is claimed is:
1. A method for forming an electrode for an electrochemical device, the method comprising:
  (a) forming a mixture comprising a lithium host material;
  (b) sintering the mixture such that a porous structure is formed; and
  (c) infiltrating the porous structure with a metallic material,
  wherein a surface of the electrode including the porous structure and the metallic material infiltrated therein preserves a metallic nature of the infiltrated metallic material at the surface.

2. The method of claim 1 wherein:
step (a) comprises casting a slurry including the mixture on a surface to form a layer, and
step (b) comprises sintering the layer.

3. The method of claim 1 wherein:
the metallic material is selected from the group consisting of Zn, Mg, Sn, Bi, Pb, Sb, In, Ga, Al, and mixtures or alloys thereof.

4. The method of claim 1 wherein:
the metallic material is resistant to a potential greater than 2.5 volts.

5. The method of claim 1 wherein:
the porous structure has a porosity volume between 5% and 30%.

6. The method of claim 1 wherein:
infiltrating the porous structure with the metallic material is undertaken in a temperature range that is less than a temperature required to densify the porous structure.

7. The method of claim 1 wherein:
the mixture comprises a solid-state ion conducting material, and
the solid-state ion conducting material has the formula $Li_u Re_v M_w A_x O_y$, wherein
Re can be any combination of elements with a nominal valance of +3 including La, Nd, Pr, Pm, Sm, Sc, Eu, Gd, Tb, Dy, Y, Ho, Er, Tm, Yb, and Lu;
M can be any combination of metals with a nominal valance of +3, +4, +5 or +6 including Zr, Ta, Nb, Sb, W, Hf, Sn, Ti, V, Bi, Ge, and Si;
A can be any combination of dopant atoms with nominal valance of +1, +2, +3 or +4 including H, Na, K, Rb, Cs, Ba, Sr, Ca, Mg, Fe, Co, Ni, Cu, Zn, Ga, Al, B, and Mn;
u can vary from 3-7.5;
v can vary from 0-3;
w can vary from 0-2;
x can vary from 0-2; and
y can vary from 11-12.5.

8. The method of claim 1 wherein:
the electrode is a cathode for a lithium ion battery, and
the lithium host material is selected from the group consisting of lithium metal oxides wherein the metal is one or more aluminum, cobalt, iron, manganese, nickel and vanadium, and lithium-containing phosphates having a general formula $LiMPO_4$ wherein M is one or more of cobalt, iron, manganese, and nickel.

9. The method of claim 1 wherein:
the electrode is a cathode for a lithium ion battery, and
the lithium host material is selected from the group consisting of lithium nickel manganese cobalt oxides.

10. The method of claim 1 wherein:
the electrode is an anode for a lithium ion battery, and
the lithium host material is selected from the group consisting of graphite, lithium titanium oxides, hard carbon, tin and cobalt alloy, or silicon and carbon.

11. The method of claim 1 wherein:
step (a) further comprises applying a stabilization coating to the lithium host material before step (b).

12. The method of claim 1 wherein:
step (b) further comprises applying a stabilization coating to the porous structure such that the stabilization coating stabilizes an interface between the porous structure and the metallic material and improves wetting between the porous structure and the metallic material.

13. The method of claim 12 wherein:
the stabilization coating comprises one or more oxides selected from boron oxide, zinc oxide, magnesium oxide, phosphorus oxide, strontium oxide, calcium oxide, barium oxide, yttrium oxide, or silicon oxide.

14. The method of claim 12 wherein:
step (b) further comprises heat treating the porous structure in a reducing environment resulting in an increased metallic nature of a surface of the porous structure before infiltrating the porous structure with the metallic material.

15. The method of claim 12 wherein:
step (b) further comprises chemically treating the porous structure to reduce a surface of the porous structure resulting in an increased metallic nature of the surface of the porous structure before infiltrating the porous structure with the metallic material.

16. A method for forming an electrochemical device, the method comprising:
(a) casting a first slurry on a surface to form a first layer, wherein the first slurry comprises a lithium host material;
(b) sintering the first layer such that a porous structure is formed;
(c) infiltrating the porous structure with a metallic material; and
(d) casting a second slurry on the first layer to form a second layer on the first layer, wherein the second slurry comprises a solid electrolyte material; and
(e) sintering the second layer,
wherein a surface of the first layer including the porous structure and the metallic material infiltrated therein preserves a metallic nature of the infiltrated metallic material at the surface.

17. The method of claim 16 wherein:
the metallic material is selected from the group consisting of Zn, Mg, Sn, Bi, Pb, Sb, In, Ga, Al, and mixtures or alloys thereof.

* * * * *

UNITED STATES PATENT AND TRADEMARK OFFICE
CERTIFICATE OF CORRECTION

Page 1 of 1

PATENT NO. : 10,903,484 B2
APPLICATION NO. : 15/793057
DATED : January 26, 2021
INVENTOR(S) : Jeffrey Sakamoto et al.

It is certified that error appears in the above-identified patent and that said Letters Patent is hereby corrected as shown below:

In the Specification

Column 12, Line 6, "Hug" should be -Huq-.

Signed and Sealed this
Sixteenth Day of March, 2021

Drew Hirshfeld
*Performing the Functions and Duties of the*
*Under Secretary of Commerce for Intellectual Property and*
*Director of the United States Patent and Trademark Office*